United States Patent
Ferro et al.

(10) Patent No.: US 8,040,257 B2
(45) Date of Patent: Oct. 18, 2011

(54) APPARATUS FOR INTERCONNECTING A PILOT STATION TO AT LEAST ONE OTHER AIRCRAFT ZONE, COCKPIT AND AIRCRAFT EQUIPPED WITH SUCH AN APPARATUS

(75) Inventors: Daniel Ferro, Muret (FR); Vincent Lautridou, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 311 days.

(21) Appl. No.: 11/965,203

(22) Filed: Dec. 27, 2007

(65) Prior Publication Data
US 2009/0273487 A1    Nov. 5, 2009

(30) Foreign Application Priority Data

Jan. 10, 2007 (FR) .................................. 07 52613

(51) Int. Cl.
*G08B 21/00* (2006.01)
*G08B 23/00* (2006.01)
*G01C 21/00* (2006.01)
*B64D 13/00* (2006.01)

(52) U.S. Cl. ........ 340/945; 340/963; 340/971; 340/973; 244/118.5; 244/118.6

(58) Field of Classification Search .................. 340/945, 340/963, 971; 244/118.5
See application file for complete search history.

(56) References Cited

U.S. PATENT DOCUMENTS

| 6,474,599 B1* | 11/2002 | Stomski ..................... 244/118.5 |
| 6,658,572 B1 | 12/2003 | Craig |
| 6,744,381 B1 | 6/2004 | Collins |
| 6,748,597 B1* | 6/2004 | Frisco et al. .................... 725/76 |
| 7,614,584 B2* | 11/2009 | Retz et al. .................. 244/118.6 |
| 2003/0006342 A1* | 1/2003 | Page, Jr. ..................... 244/118.5 |
| 2003/0132859 A1 | 7/2003 | Bissett |
| 2003/0146347 A1 | 8/2003 | Roessner et al. |
| 2004/0245409 A1 | 12/2004 | Cordina et al. |
| 2005/0012642 A1* | 1/2005 | Sacle .......................... 340/973 |
| 2005/0116098 A1* | 6/2005 | Martens et al. ............ 244/118.5 |
| 2005/0230550 A1* | 10/2005 | Dominguez ............... 244/129.5 |
| 2006/0007020 A1* | 1/2006 | Biermann .................... 340/945 |
| 2006/0032977 A1 | 2/2006 | Simmons et al. |
| 2006/0169840 A1 | 8/2006 | French et al. |

* cited by examiner

*Primary Examiner* — George Bugg
*Assistant Examiner* — Jack Wang
(74) *Attorney, Agent, or Firm* — Oblon, Spivak, McClelland, Maier & Neustadt, L.L.P.

(57) ABSTRACT

An interconnecting apparatus for interconnecting a pilot station of an aircraft to at least one aircraft zone includes a device for communicating between the pilot station and the aircraft zone. The aircraft zone includes a device permitting a person present in the aircraft zone to identify themselves and a display device indicating a functional status of the aircraft. The pilot station includes a display device indicating a location of each person being identified in the aircraft zone.

14 Claims, 1 Drawing Sheet

APPARATUS FOR INTERCONNECTING A PILOT STATION TO AT LEAST ONE OTHER AIRCRAFT ZONE, COCKPIT AND AIRCRAFT EQUIPPED WITH SUCH AN APPARATUS

BACKGROUND OF THE INVENTION

I. Field of the Invention

The present invention relates to an apparatus for interconnecting a pilot station to at least one other aircraft zone. It also relates to an aircraft cockpit and to an aircraft equipped with such an interconnecting apparatus.

II. Description of Related Art

A cockpit of the aircraft serves to house the technical crew of this aircraft during the different phases of the flight. In general, this term is synonymous with pilot station. Here, however, another zone such as a private lavatory or a rest zone can be integrated in an original manner into the cockpit. What is referred to as pilot station then is the portion of the cockpit reserved for flying the aircraft. The pilot station is therefore provided, for example, with seats to accommodate the pilots during the phases of the flight as well as aircraft control means, monitoring screens, etc.

In the area of commercial transportation of passengers, the large aircraft are designed to be flown by two pilots. Such an obligation is applicable to the majority of aircraft of this type, and, except for reasons of paramount necessity, two pilots must be continuously present in their seats not only to accomplish their routine tasks but also to be ready to intervene in any emergency situations that necessitate the intervention of two pilots.

In addition, the working time of the pilots during a flight is regulated. Thus, during very long flights lasting more than ten hours or so, a relief pilot must be available. It is therefore common for three or four pilots to participate in the same flight.

It is noted in addition that a pilot may have to visit the lavatory even when he is at the controls of the aircraft. This is tolerated to the extent that the absence of the pilot is of short duration and, of course, the other pilot remains at the controls, ready to deal with any situation that could transpire.

The pilots are also required to communicate with the commercial crew on board the aircraft. These communications take place before and after the flight for technical and administrative coordination concerning the flight. This is generally done in person. During the flight, communications between the pilots and the commercial crew take place in order to deal with the successive sequences of the flight either by a general intercom for passing on general messages or by private intercom or else even directly in person.

BRIEF SUMMARY OF THE INVENTION

The problem underlying the present invention is to know whether it is possible to operate an aircraft in cruising flight technically with a single pilot at the controls. The original idea at the basis of the present invention is that an improvement of the communication between the pilots themselves, but also between the pilots and the commercial crew, in addition to other possible developments of support systems for navigation, guidance, flying and/or system management, would make it possible for a single pilot to be at the controls of the aircraft, with complete safety, during cruising flight.

The objective of the present invention is then to provide improved communication means on board an aircraft. These novel communication means are preferably also adapted to the new requirements in the matter of security, especially following the terrorist events of 11 Sep. 2001.

To this end, it proposes an apparatus for interconnecting a pilot station of an aircraft to at least one aircraft zone, provided with means of communicating between the said pilot station and the said aircraft zone.

According to the present invention, this interconnecting apparatus is additionally provided in the said aircraft zone on the one hand with means permitting a person present in this zone to identify himself and on the other hand with display means permitting the functional status of the aircraft to be indicated, and it is provided in the pilot station with display means indicating the location of each person being identified in an aircraft zone.

In this way, the communication between the pilot station and another aircraft zone is substantially improved. On the one hand, a pilot at the controls knows where the other pilots are located, and, on the other hand, each pilot who is not at the pilot station knows the functional status of the aircraft and can intervene in case of need.

In a preferred embodiment, the interconnecting apparatus according to the invention is provided at the pilot station with a device for recognizing a distress situation as well as with means for displaying the functional status of the aircraft on the display means of each zone equipped with display means. In this way, the persons present in the zones equipped with means for displaying the functional status are informed almost in real time of a distress situation.

To make it possible to send distress messages automatically, the interconnecting apparatus can also be provided at the pilot station with a device for detecting an incapacitated pilot. When incapacity of a pilot is detected, an alarm can then be tripped and communicated to display means in the various aircraft zones equipped therewith.

As already suggested hereinabove, the interconnecting apparatus according to the invention connects the pilot station preferably to several aircraft zones in such a way that the communication between the different crew members distributed in the aircraft is better.

The present invention also relates to an aircraft cockpit, characterized in that it is provided with an interconnecting apparatus such as described hereinabove. As an example, such an aircraft cockpit is provided not only with a pilot station but also a with lavatory, and the interconnecting apparatus preferably connects the pilot station to the private lavatory. As another example, an aircraft cockpit can be provided not only with a pilot station but also with a rest zone, and the interconnecting apparatus then advantageously connects the pilot station to the rest zone.

For security reasons, in order to prevent intrusion of an ill-intentioned person (such as a terrorist) into the cockpit, the cockpit is advantageously separated from an aircraft cabin by a secured, armor-plated door, and a cabin zone intended in particular for the flight personnel is provided on the one hand with means permitting a person present in this zone to identify himself and on the other hand with display means permitting the functional status of the aircraft to be indicated. Preferably means for unlocking the secured door are provided for such a cockpit, and these unlocking means are controlled on the one hand from the pilot station and on the other hand automatically in certain predetermined emergency situations.

Finally, the present invention also relates to an aircraft, characterized in that it is provided with a pilot station as well as with an interconnecting apparatus such as described hereinabove and/or a cockpit such as described hereinabove.

Details and advantages of the present invention will become more apparent from the description hereinafter, given with reference to the attached schematic drawings, wherein:

BRIEF DESCRIPTION OF THE DRAWINGS

The single FIGURE very schematically illustrates the front part of an aircraft according to the invention.

DETAILED DESCRIPTION OF THE INVENTION

Figure 1:
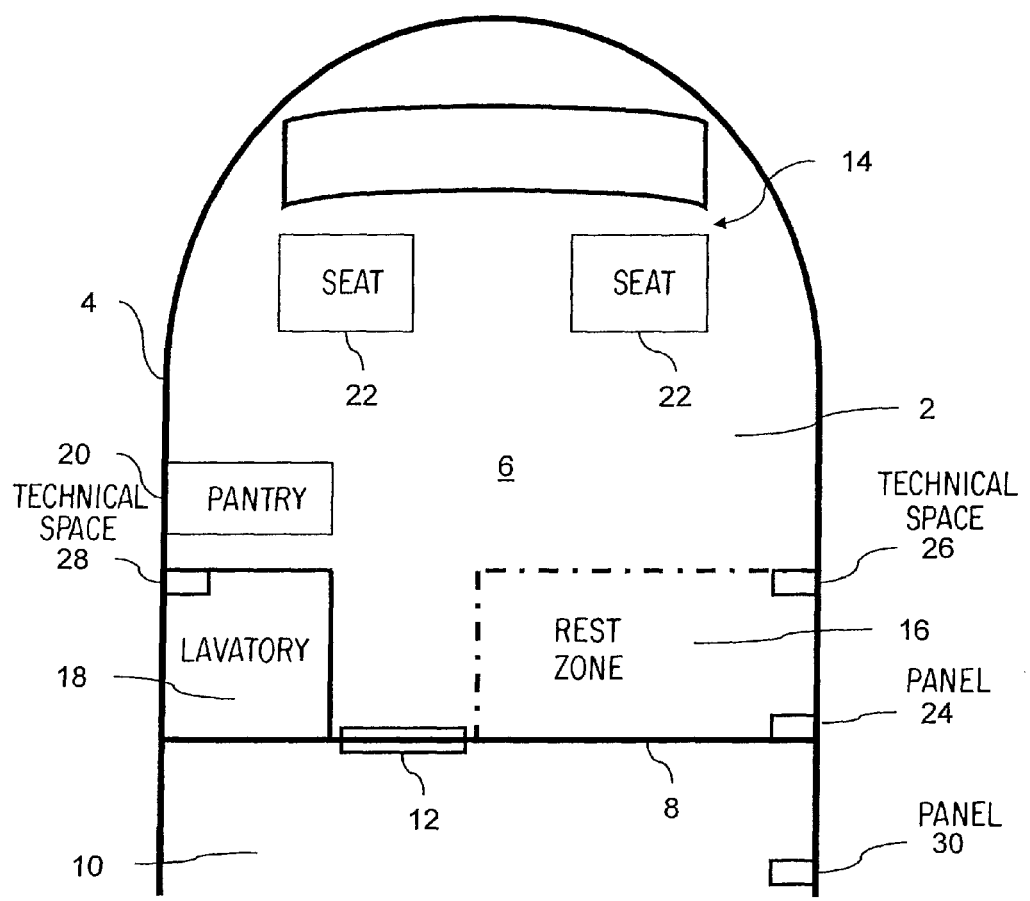

The attached FIGURE illustrates a preferred embodiment of a cockpit according to the invention. It is appropriate to note here that an interconnecting apparatus according to the present invention may also be applied to prior art aircraft having a cockpit that is reduced to a pilot station.

As indicated in the introduction, by cockpit of the aircraft there is understood here the compartment thereof that serves to house the technical crew of the aircraft during the different phases of the flight. Although this term is generally synonymous with the pilot station, what is referred to hereinafter as pilot station will be the cockpit zone reserved for flying the aircraft. This pilot station is provided in traditional manner with aircraft control means, monitoring screens, etc., and is also provided with seats intended to accommodate the pilots.

Thus there is recognized in the single FIGURE a schematic diagram of an aircraft cockpit 2. This cockpit 2 is situated at the front of the aircraft under consideration, and there is recognized the usual rounded shape of the front of an aircraft in the FIGURE. This cockpit 2 is bounded on the one hand from the outside of the aircraft by an outer wall 4 forming the front fuselage of the aircraft and on the other hand by a floor 6 assumed to be substantially horizontal and a separating partition 8 assumed to be substantially vertical. As is the case in the majority of aircraft, it is assumed in the illustrated embodiment that floor 6 of cockpit 2 is the extension toward the front of the aircraft of a floor of a cabin 10 intended to accommodate passengers.

Separating partition 8 makes it possible to separate cabin 10, which is also the zone to which the passengers have authorized access, from cockpit 2, in which only the flight crew or even exclusively the pilots are authorized to enter during a flight. This separating partition 8 extends from floor 6 to a ceiling (not illustrated) common to cabin 10 and cockpit 2.

Separating partition 8 is equipped with a door 12. This door is preferably secured. In common with separating partition 8, it may be armor-plated, as required by the current regulations. In addition, except under special conditions described hereinafter, it can be opened only from the interior of cockpit 2.

In cockpit 2 of FIG. 1, there are illustrated a pilot station 14, a rest zone 16, a lavatory 18 and a pantry unit 20.

Pilot station 14 is represented as a prior art pilot station. Therein there are disposed control means and monitoring means similar to those of known pilot stations. Nevertheless, they include supplementary means described hereinafter.

In the illustrated embodiment, lavatory 18 is situated at the rear of cockpit 2, against separating wall 8. Whether it is disposed on the right or left of door 12 is immaterial, and it is not necessarily backed by separating wall 8. As illustrated in the single FIGURE, door 12 is not necessarily centered relative to the longitudinal axis of the aircraft and/or to separating partition 8. Lavatory 18 is separated from the rest of cockpit 2 by suitable partitions, and it can be entered via a door. Particular attention is preferably paid to sound insulation and ventilation of lavatory 18.

It is noted that, in original manner, access to lavatory 18 is possible only from the interior of cockpit 2. The same is true for rest zone 16 illustrated in the FIGURE. As an example, this rest zone 16 is provided with one (or two) easy chairs, one (or two) berth(s), etc., as a function of the number of pilots who may need to rest. Of course, a ventilation and lighting system is also provided in this rest zone. Other equipment, for example of the entertainment type (screens for watching films, etc.), may also be provided. In the illustrated embodiment, rest zone 16 is also disposed against separating partition 8. Of course, other locations for this rest zone 16, both inside cockpit 2 and outside it, can also be envisioned within the scope of the present invention.

Pantry unit 20, together with lavatory 18 and rest zone 16, allows the pilots to be independent in the interior of the cockpit. Pantry unit 20 is an element referred to more commonly by the English term "galley". As an example, such a pantry unit contains hot and cold beverages, meals and also means for reheating the latter. The position of pantry unit 20 next to lavatory 18 in the FIGURE is given simply by way of illustration.

The present invention proposes to offer the pilot(s) at the controls of the aircraft the ability to work completely efficiently during the cruising phase, by permitting him (them) in particular to communicate with the other pilots, regardless of their positions in the airplane (cockpit, cabin, etc.). In addition, according to the present invention, a pilot who is not present in pilot station 14 is able to know the functional status of the aircraft and to communicate or coordinate with pilot station 14 on the one hand and cabin 10 on the other. In this way the crew shares the information essential to teamwork among all the flight personnel, even if they are dispersed in several zones of the aircraft. The interconnecting apparatus according to the invention makes it possible to improve the communication between pilot station 14 and the other aircraft zones in which a pilot may be present. In a preferred embodiment, this pilot station 14 is provided first of all with a device that permits the pilots present there to communicate acoustically with the pilot(s) located in another zone of the airplane (rest zone 16, lavatory 18, cabin 10 or possibly luggage hold).

Pilot station 14 is also provided with a device that permits the pilots present there to know the location of the other pilot(s). As an example, this device is therefore provided with a display screen connected to identification devices, described hereinafter, capable of indicating the position of the other pilot(s) to the pilots at the controls.

To improve the communication between the pilots at the controls and the rest of the flight personnel, there is provided in particular a device that permits the pilots at the controls to transmit distress information on the one hand to the pilots located in the other zones of the airplane and on the other hand to secured door 12, in such a way as to unlock it if necessary (as a function of the distress information) and then to permit the other crew members to render assistance to the persons present in the cockpit, and even to replace an incapacitated pilot if necessary.

Pilot station 14 can also be equipped with a device capable of detecting an incapacitated pilot. As an example, this device can detect when one or the other of the pilots occupying one of the two seats 22 of pilot station 14 begins to fall asleep. This device can activate a specific alarm when it detects that a pilot is beginning to fall asleep. If the pilot in question does not respond to this alarm, the device for detecting an incapacitated pilot can automatically send an alert message to the other crew members to inform them of the situation, and can also command door 12 to unlock in order to permit access to cockpit 2, especially in the case in which no other pilot is present in cockpit 2.

In an advantageous embodiment, pilot station 14 is also provided with a device for programming the scheduled waking and resting periods of the pilots. This device is preferably connected to rest zone 16. It may be associated with an automatic alarm that is activated in rest zone 16 in accordance with programmed periods.

Elements of the interconnecting apparatus according to the invention described here are located in rest zone 16. These elements are grouped here in a panel 24 illustrated schematically in the FIGURE.

This panel 24 is provided firstly with acoustic communication means that cooperate with the acoustic communication means of pilot station 14. These acoustic communication means also permit communication with the other aircraft zones (private lavatory, cabin, possibly luggage hold).

In rest zone 16, possibly on panel 24, it is also advantageous to provide means of communicating with contact persons outside the aircraft, such as persons performing air traffic control.

Panel 24 is also provided with a system for presenting the functional and operational status of the aircraft. In the preferred embodiment described here, this presentation system is provided in particular with:

presentation of the status of coordination of the crew, for example indicating the time of the next relief, information about arrival of the relief on schedule, etc.

presentation of the status of the pilot(s) at the controls (name of the pilot(s)), low vigilance alert, pilot possibly in the lavatory, etc.). This presentation, in common with the preceding, can be achieved by means of a display screen. In the present case, in the event of an alert, especially if a pilot at the controls is incapacitated, an acoustic alert may also be provided.

presentation of the operational status (nominal, diversion, emergency, etc.) of the flight in progress.

presentation of the functional status of the airplane giving indications of problems that may have been encountered: for example, faulty system and/or impacts on the functions of the aircraft, slow or fast depressurization condition, smoke procedure, engine failure, electrical failure, etc. This presentation can be provided on a display screen and also be associated with an acoustic alert device, which sounds in the event of a critical or important failure. This functional status permits the pilot(s) who is or are present in rest zone 16 to know explicitly or implicitly the procedures that they must follow. These procedures may also be displayed, or an interface for requesting the display of these procedures may be provided.

Panel 24 is also provided with a device that permits each person, especially each pilot who is present in rest zone 16 to indicate his location. This identification device may be located on panel 24, but it also may be located just to the side of the access door to rest zone 16. Identification is effected, for example, by means of a magnetic badge. It can be provided that a person entering or exiting rest zone 16 must present his badge to a reader. In an alternative embodiment, it can be provided that the badge is equipped with a transmitter/receiver device and that corresponding antennas are disposed in rest zone 16 in order to detect the presence of the badge in the rest zone (by RFID technology, for example). When the badge is detected, the corresponding information is sent to the display device provided for this purpose in the pilot station.

It is noted in the FIGURE that rest zone 16 contains a technical space 26. As an example, this space is equipped with portable oxygen-generating devices. These are in sufficient number to permit the pilot(s) in rest zone 16 to move about and return to pilot station 14 in complete safety in the event of depressurization.

Lavatory 18 is provided with equipment similar to that present in rest zone 16. As an example, lavatory 18 is equipped with a system for presentation of the functional and operational status of the aircraft. Preferably there is provided a system that is similar to the system located in rest zone 16 for presentation of the functional and operational status of the aircraft. Nevertheless, it is not necessary to provide the presentation of the status of the coordination of the crew in lavatory 18. In contrast, there is preferably provided a presentation of the status of the pilot at the controls, of the operational status and of the functional status of the aircraft.

There is also a device making it possible to inform the person in the lavatory of his location. Of course, the technique used to indicate his location in a given zone of the aircraft is preferably the same for all zones of the aircraft.

Also in lavatory 18 is a device for communicating acoustically with the pilot(s) at the controls and if necessary with the other pilots present in the aircraft.

Lavatory 18 is also preferably equipped with a device that permits its occupant to receive messages and to communicate with the usual external contact persons during a flight, in particular the air traffic control personnel.

Finally, there can be provided in lavatory 18 a portable oxygen-generating device that permits the pilot in the lavatory to return to pilot zone 14 in complete safety in the event of depressurization.

As an example, all these various communication, information and security devices are grouped in a technical space 28 of lavatory 18 illustrated schematically on the single FIGURE.

In a preferred embodiment of the present invention, it is provided that cabin 10 is equipped with at least one panel 30 permitting display of the functional and operational status of the aircraft. This panel is also provided with devices for communicating acoustically with the pilot(s) at the controls of the aircraft and possibly with the other aircraft zones (lavatory, rest zone, etc.), and preferably it is also provided with means of communicating with the outside (air traffic control, for example). This panel 30 is also provided with means permitting identification of the presence of a pilot in cabin 10.

In certain emergency situations, it may be useful for the commercial flight personnel in cabin 10 to be aware of the location of the various pilots present on board the aircraft. To this end, the capability of displaying the location of the pilots is preferably provided on each panel 30. This display can be a permanent display. Nevertheless, it is also possible to provide an interface with which this information can be requested. This interface can also be used for other functions.

Similar equipment can also be provided in the luggage hold of the aircraft.

The interconnecting apparatus described in the foregoing makes it possible to connect different specialized zones of the aircraft and to share information essential to the different members of the crew, even when they are dispersed in several zones of the aircraft.

The apparatus described in the foregoing permits the pilot(s) at the controls to be aware continuously of the location of the other pilots and to communicate rapidly and easily with them. In particular, it is possible from pilot station 14 to transmit information of emergency nature, such as the existence of a smoke detection procedure, very rapidly to all the pilots present in the aircraft. In this way, a sole pilot at the aircraft controls can very easily obtain assistance by recalling one (or two) other pilot(s) by virtue of the high-speed transmission of information of emergency nature. The described interconnecting apparatus also permits the pilots in rest zone 16 and possibly in lavatory 18 to be aware of the functional status of the aircraft and to be alerted in the event of an emergency situation. The display, information and communication panels present in cabin 10 also permit the flight personnel in the cabin to be aware of the functional status of the aircraft and to be alerted manually or automatically in the case of failures requiring their intervention.

The interconnecting apparatus described hereinabove permits a sole pilot at the aircraft controls to coordinate rapidly and efficiently with the other crew members, pilots or commercial flight personnel, wherever they are located. In an aircraft with a two-pilot crew, this makes it possible to improve the coordination between the members of the crew. Because of this, on very long flights the number of pilots present on board can be reduced, because the sole pilot at the controls can easily coordinate with the personnel in the cabin and with the pilot(s) in order to deal with emergency situations. The sole pilot at the controls can even visit the lavatory without risk of losing information or missing important communications.

If it is considered that only one pilot is necessary at the aircraft controls during cruising flight, at least one of the seats provided for accommodating the pilots can be a seat that is convertible to a berth or at least a seat that can recline by 180°. This seat then preferably offers comfort equivalent to a berth. As an example, its arm rests are retractable arm rests that permit the bedding surface to be enlarged. To permit the pilot lying on the seat converted to a berth then to be isolated, this seat is preferably provided with a canopy that is visually opaque and acoustically insulating. This canopy can be folded up at one end of the seat (considering the seat in elongated condition here) and can be easily unfolded, either manually or by means of an electric controller. To allow the capability of dealing with emergency situations, the mechanism for folding up the canopy must be capable of being activated automatically and rapidly (for example, by means of springs) at the request of the occupant or of another crew member.

The present invention is not limited to the preferred embodiment described in the foregoing by way of non-limitative example. It also relates to all the alternative embodiments within the capacity of the person skilled in the art within the scope of the claims hereinafter.

Thus the cockpit configuration integrating a private lavatory, a rest zone and a pantry unit is a preferred embodiment that is particularly well adapted to increasing the on-board security of the aircraft and preventing any intrusion into the cockpit. This configuration in particular permits the pilots in the cockpit to live autonomously during a flight, even of long distance type.

Different alternative embodiments can be envisioned for managing the opening of the secured door separating the cockpit and the cabin. The emergency situations in which this door may be unlocked can be managed by the interconnecting apparatus according to the invention, but they also can be managed by other devices of the aircraft.

The invention claimed is:

1. An interconnecting apparatus to interconnect a pilot station zone of an aircraft to at least one additional aircraft zone including a private lavatory zone, a pilot rest zone, and a cabin zone, the interconnecting apparatus comprising:
a communication device that communicates between the pilot station zone and the at least one additional aircraft zone;
an identification device disposed in each aircraft zone that permits a person in the aircraft zone to identify themselves;
a first display disposed in each aircraft zone that displays a functional status of the aircraft; and
a second display disposed in the pilot station zone that displays a location of each person being identified in each of the at least one additional aircraft zone, wherein
the functional status of the aircraft indicates an existence of problems with the aircraft encountered during flight, and
the problems include at least one of a low or fast depressurization condition, a presence of smoke, an engine failure, and an electrical failure.

2. The interconnecting apparatus according to claim 1, wherein the pilot station zone further includes a device that recognizes a distress situation and the first display that displays the functional status of the aircraft.

3. The interconnecting apparatus according to claim 1, wherein the interconnecting apparatus connects the pilot station zone to several aircraft zones.

4. An aircraft cockpit, comprising an interconnecting apparatus according to claim 1.

5. The aircraft cockpit according to claim 4, further comprising a pilot station and a private lavatory, wherein the interconnecting apparatus connects the pilot station to the private lavatory.

6. The aircraft cockpit according to claim 4, further comprising a pilot station and a pilot rest zone, wherein the interconnecting apparatus connects the pilot station to the pilot rest zone.

7. The cockpit according to claim 4, wherein the cockpit is separated from an aircraft cabin by a secured, armor-plated door, and the cabin includes an identification device that permits a person in the cabin to identify themselves and the first display that displays the functional status of the aircraft.

8. The cockpit according to claim 7, further comprising an unlocking device that unlocks the secured door, wherein the unlocking device is controlled from the pilot station and is automatically controllable in certain predetermined emergency situations.

9. An aircraft, comprising a pilot station and an interconnecting apparatus according to claim 1.

10. The aircraft cockpit according to claim 5, wherein an access to the lavatory is provided only from an interior of the cockpit.

11. The aircraft cockpit according to claim 6, wherein an access to the rest zone is provided only from an interior of the cockpit.

12. An aircraft, comprising:
a cockpit including a pilot station zone, a lavatory zone, and a pilot rest zone;
a cabin zone including a space for passengers of the aircraft; and
an interconnecting apparatus comprising:
a communication device that communicates between the pilot station zone and at least one of the other zones;

an identification device disposed in each of the aircraft zones that permits a person in the aircraft zone to identify themselves;

a first display disposed in each of the aircraft zones that displays a functional status of the aircraft; and a second display disposed in the pilot station zone that displays a location of each person being identified in each of the aircraft zones, wherein the functional status of the aircraft indicates an existence of problems with the aircraft encountered during flight, and the problems include at least one of a low or fast depressurization condition, a presence of smoke, an engine failure, and an electrical failure.

13. The aircraft according to claim 12, wherein an access to the lavatory zone is provided only from an interior of the cockpit.

14. The aircraft according to claim 12, wherein an access to the pilot rest zone is provided only from an interior of the cockpit.

* * * * *